(12) United States Patent
Vujcic et al.

(10) Patent No.: US 8,687,564 B2
(45) Date of Patent: Apr. 1, 2014

(54) RANDOM ACCESS DIMENSIONING METHODS AND PROCEDURES FOR FREQUENCY DIVISION MULTIPLEXING ACCESS SYSTEMS

(75) Inventors: Dragan Vujcic, Limours (FR); Patrick Fischer, Bourg la Reine (FR)

(73) Assignee: LG Electronics Inc., Seoul (KR)

( * ) Notice: Subject to any disclaimer, the term of this patent is extended or adjusted under 35 U.S.C. 154(b) by 944 days.

(21) Appl. No.: 12/092,705

(22) PCT Filed: Nov. 3, 2006

(86) PCT No.: PCT/KR2006/004560
§ 371 (c)(1),
(2), (4) Date: May 5, 2008

(87) PCT Pub. No.: WO2007/052971
PCT Pub. Date: May 10, 2007

(65) Prior Publication Data
US 2008/0279257 A1    Nov. 13, 2008

Related U.S. Application Data

(60) Provisional application No. 60/733,733, filed on Nov. 4, 2005.

(51) Int. Cl.
*H04W 4/00* (2009.01)
*H04L 12/28* (2006.01)

(52) U.S. Cl.
USPC ....... 370/329; 370/332; 370/395.21; 370/480

(58) Field of Classification Search
None
See application file for complete search history.

(56) References Cited

U.S. PATENT DOCUMENTS

| | | | |
|---|---|---|---|
| 5,991,633 A * | 11/1999 | Corriveau et al. | 455/466 |
| 6,574,212 B1 | 6/2003 | Jügensen et al. | |
| 6,606,309 B1 * | 8/2003 | Wang | 370/322 |
| 6,859,445 B1 * | 2/2005 | Moon et al. | 370/335 |
| 2001/0024956 A1 * | 9/2001 | You et al. | 455/455 |
| 2001/0026539 A1 | 10/2001 | Kornprobst et al. | |

(Continued)

FOREIGN PATENT DOCUMENTS

| | | |
|---|---|---|
| CN | 1316866 | 10/2001 |
| CN | 1437416 | 8/2003 |

(Continued)

OTHER PUBLICATIONS

"3rd Generation Partnership Project; Technical Specification Group Radio Access Network; Medium Access Control (MAC) protocol specification (Release 6)", 3GPP TS 25.321 V6.6.0, Sep. 2005, XP-050367692.

(Continued)

*Primary Examiner* — Yemane Mesfin
*Assistant Examiner* — Christine Duong
(74) *Attorney, Agent, or Firm* — Lee, Hong, Degerman, Kang & Waimey

(57) ABSTRACT

A method of determining random access resources performed by a mobile terminal, the method comprising: receiving information on available random access resources from a network; deciding how to derive the random access resources to be allowed based on default values or information received from the network; measuring received signal quality of at least one of a cell to be accessed and a neighboring cell; and deriving the allowed random access resources based on the deciding and the measuring.

18 Claims, 7 Drawing Sheets

(56) References Cited

U.S. PATENT DOCUMENTS

| | | |
|---|---|---|
| 2001/0036113 A1 | 11/2001 | Jurgensen et al. |
| 2001/0038619 A1* | 11/2001 | Baker et al. ............... 370/335 |
| 2002/0089957 A1* | 7/2002 | Viero ........................ 370/336 |
| 2003/0189949 A1* | 10/2003 | Belaiche .................... 370/462 |
| 2004/0001429 A1 | 1/2004 | Ma et al. |
| 2004/0008658 A1 | 1/2004 | Dahlman et al. |
| 2004/0110521 A1* | 6/2004 | Soldani et al. ............. 455/509 |
| 2004/0156328 A1* | 8/2004 | Walton et al. .............. 370/313 |
| 2004/0264497 A1* | 12/2004 | Wang et al. ................ 370/465 |
| 2005/0232158 A1* | 10/2005 | Hondo ........................ 370/241 |
| 2005/0286409 A1* | 12/2005 | Yoon et al. ................. 370/210 |
| 2007/0064665 A1* | 3/2007 | Zhang et al. ............... 370/343 |
| 2008/0070610 A1* | 3/2008 | Nishio ....................... 455/509 |

FOREIGN PATENT DOCUMENTS

| | | |
|---|---|---|
| CN | 1463097 | 12/2003 |
| EP | 1102512 | 5/2001 |
| GB | 2399991 | 9/2004 |

OTHER PUBLICATIONS

"3rd Generation Partnership Project; Technical Specification Group Radio Access Network; Radio Resource Control (RRC) protocol specification (Release 6)", 3GPP TS 25.331 V6.7.0, Sep. 2005, XP-050367984.

* cited by examiner

Fig. 4
PRIOR ART
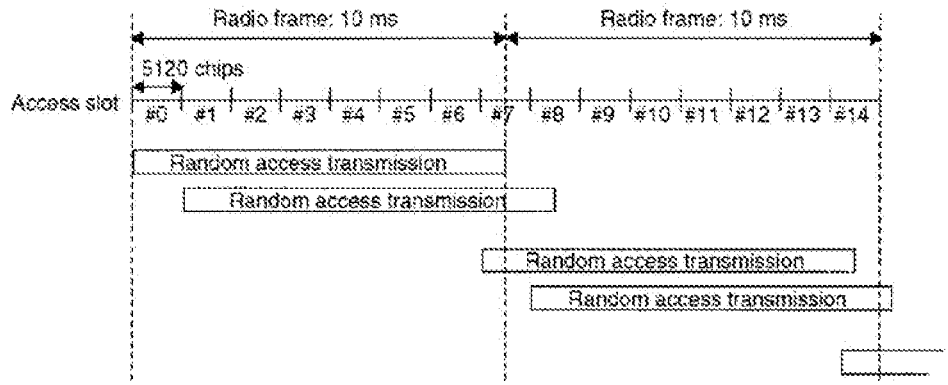
Fig. 5
PRIOR ART
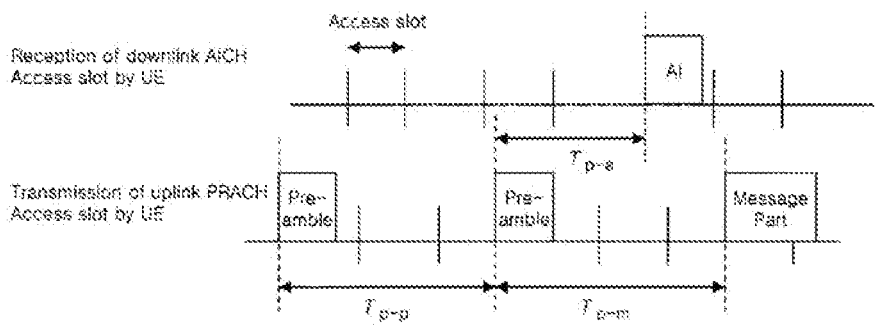
Fig. 6
PRIOR ART
| SFN modulo 8 of corresponding P-CCPCH frame | Sub-channel number | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| 0 | 0 | 1 | 2 | 3 | 4 | 5 | 6 | 7 | | | | |
| 1 | 12 | 13 | 14 | | | | | | 8 | 9 | 10 | 11 |
| 2 | | | | 0 | 1 | 2 | 3 | 4 | 5 | 6 | 7 | |
| 3 | 9 | 10 | 11 | 12 | 13 | 14 | | | | | | 8 |
| 4 | 6 | 7 | | | | | 0 | 1 | 2 | 3 | 4 | 5 |
| 5 | | | 6 | 9 | 10 | 11 | 12 | 13 | 14 | | | |
| 6 | 3 | 4 | 5 | 6 | 7 | | | | | 0 | 1 | 2 |
| 7 | | | | | 8 | 9 | 10 | 11 | 12 | 13 | 14 | |

Fig. 7
PRIOR ART
| Preamble signature | Value of n | | | | | | | | | | | | | | | |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| $P_0(n)$ | 1 | 1 | 1 | 1 | 1 | 1 | 1 | 1 | 1 | 1 | 1 | 1 | 1 | 1 | 1 | 1 |
| $P_1(n)$ | 1 | -1 | 1 | -1 | 1 | -1 | 1 | -1 | 1 | -1 | 1 | -1 | 1 | -1 | 1 | -1 |
| $P_2(n)$ | 1 | 1 | -1 | -1 | 1 | 1 | -1 | -1 | 1 | 1 | -1 | -1 | 1 | 1 | -1 | -1 |
| $P_3(n)$ | 1 | -1 | -1 | 1 | 1 | -1 | -1 | 1 | 1 | -1 | -1 | 1 | 1 | -1 | -1 | 1 |
| $P_4(n)$ | 1 | 1 | 1 | 1 | -1 | -1 | -1 | -1 | 1 | 1 | 1 | 1 | -1 | -1 | -1 | -1 |
| $P_5(n)$ | 1 | -1 | 1 | -1 | -1 | 1 | -1 | 1 | 1 | -1 | 1 | -1 | -1 | 1 | -1 | 1 |
| $P_6(n)$ | 1 | 1 | -1 | -1 | -1 | -1 | 1 | 1 | 1 | 1 | -1 | -1 | -1 | -1 | 1 | 1 |
| $P_7(n)$ | 1 | -1 | -1 | 1 | -1 | 1 | 1 | -1 | 1 | -1 | -1 | 1 | -1 | 1 | 1 | -1 |
| $P_8(n)$ | 1 | 1 | 1 | 1 | 1 | 1 | 1 | 1 | -1 | -1 | -1 | -1 | -1 | -1 | -1 | -1 |
| $P_9(n)$ | 1 | -1 | 1 | -1 | 1 | -1 | 1 | -1 | -1 | 1 | -1 | 1 | -1 | 1 | -1 | 1 |
| $P_{10}(n)$ | 1 | 1 | -1 | -1 | 1 | 1 | -1 | -1 | -1 | -1 | 1 | 1 | -1 | -1 | 1 | 1 |
| $P_{11}(n)$ | 1 | -1 | -1 | 1 | 1 | -1 | -1 | 1 | -1 | 1 | 1 | -1 | -1 | 1 | 1 | -1 |
| $P_{12}(n)$ | 1 | 1 | 1 | 1 | -1 | -1 | -1 | -1 | -1 | -1 | -1 | -1 | 1 | 1 | 1 | 1 |
| $P_{13}(n)$ | 1 | -1 | 1 | -1 | -1 | 1 | -1 | 1 | -1 | 1 | -1 | 1 | 1 | -1 | 1 | -1 |
| $P_{14}(n)$ | 1 | 1 | -1 | -1 | -1 | -1 | 1 | 1 | -1 | -1 | 1 | 1 | 1 | 1 | -1 | -1 |
| $P_{15}(n)$ | 1 | -1 | -1 | 1 | -1 | 1 | 1 | -1 | -1 | 1 | 1 | -1 | 1 | -1 | -1 | 1 |
Fig. 8
PRIOR ART
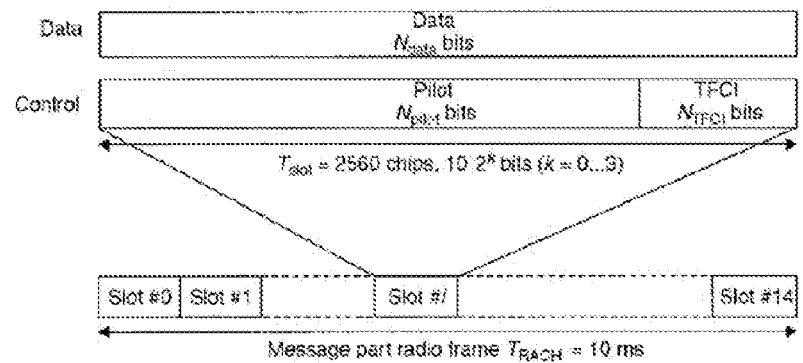
Fig. 9
PRIOR ART
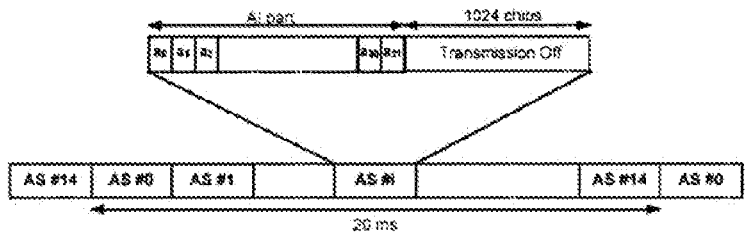
Figure 8A: Structure of the AICH
Fig. 10
PRIOR ART
| AC | 0 - 9 | 10 | 11 | 12 | 13 | 14 | 15 |
|---|---|---|---|---|---|---|---|
| ASC | 1st IE | 2nd IE | 3rd IE | 4th IE | 5th IE | 6th IE | 7th IE |

[Fig. 17

RANDOM ACCESS DIMENSIONING METHODS AND PROCEDURES FOR FREQUENCY DIVISION MULTIPLEXING ACCESS SYSTEMS

This application is the National Stage filing under 35 U.S.C. §371 of International Application No. PCT/KR2006/004560, filed Nov. 3, 2006, which claims the benefit of U.S. Provisional Application No. 60/733,733, filed Nov. 4, 2005.

TECHNICAL FIELD

The present disclosure relates to radio communications, and in particular, relates to random access dimensioning methods and procedures for frequency division multiplexing access systems.

BACKGROUND ART

A radio (wireless) communication system may be comprised of an access network and a plurality of access terminals. The access network may include access points, such as Node Bs, base stations, or the like, that allow the access terminals to connect with the access network for uplink (UL: terminal-to-network) communications and downlink (DL: network-to-terminal) communications via various types of channels. The access terminals may be user equipment (UE), mobile stations, or the like.

Although the concepts described hereafter may be applicable to different types of communication systems, the Universal Mobile Telecommunications System (UMTS) will be described merely for exemplary purposes. A typical UMTS has at least one core network (CN) connected with at least one UTRAN (UMTS Terrestrial Radio Access Network) that has Node Bs acting as access points for multiple UEs.

FIG. 1 shows the radio interface protocol architecture according to the 3GPP radio access network standards. The radio interface protocol has horizontal layers comprising a physical layer, a data link layer, and a network layer, and has vertical planes comprising a user plane (U-plane) for transmitting user data and a control plane (C-plane) for transmitting control information. The user plane is a region that handles traffic information with the user, such as voice or Internet protocol (IP) packets. The control plane is a region that handles control information for an interface with a network, maintenance and management of a call, and the like.

The protocol layers in FIG. 1 can be divided into a first layer (L1), a second layer (L2), and a third layer (L3) based on the three lower layers of an open system inter-connection (OSI) standard model. The first layer (L1), namely, the physical layer (PHY), provides an information transfer service to an upper layer by using various radio transmission techniques. The physical layer is connected to an upper layer called a medium access control (MAC) layer, via a transport channel. The MAC layer and the physical layer exchange data via the transport channel. The second layer (L2) includes a MAC layer, a radio link control (RLC) layer, a broadcast/multicast control (BMC) layer, and a packet data convergence protocol (PDCP) layer. The MAC layer handles mapping between logical channels and transport channels and provides allocation of the MAC parameters for allocation and re-allocation of radio resources. The MAC layer is connected to an upper layer called the radio link control (RLC) layer, via a logical channel. Various logical channels are provided according to the type of information transmitted.

The MAC layer is connected to the physical layer by transport channels and can be divided into a MAC-b sub-layer, a MAC-d sub-layer, a MAC-c/sh sub-layer, a MAC-hs sub-layer and a MAC-m sub-layer according to the type of transport channel being managed. The MAC-b sub-layer manages a BCH (Broadcast Channel), which is a transport channel handling the broadcasting of system information. The MAC-c/sh sub-layer manages a common transport channel, such as a forward access channel (FACH) or a downlink shared channel (DSCH), which is shared by a plurality of terminals, or in the uplink, the Random Access Channel (RACH). The MAC-m sub-layer may handle the MBMS data. The MAC-d sub-layer manages a dedicated channel (DCH), which is a dedicated transport channel for a specific terminal. The MAC-d sub-layer is located in a serving RNC (SRNC) that manages a corresponding terminal and one MAC-d sub-layer also exists in each terminal.

The RLC layer, depending of the RLC mode of operation, supports reliable data transmissions and performs segmentation and concatenation on a plurality of RLC service data units (SDUs) delivered from an upper layer. When the RLC layer receives the RLC SDUs from the upper layer, the RLC layer adjusts the size of each RLC SDU in an appropriate manner based upon processing capacity, and then creates data units by adding header information thereto. These data units, called protocol data units (PDUs), are transferred to the MAC layer via a logical channel. The RLC layer includes a RLC buffer for storing the RLC SDUs and/or the RLC PDUs.

The BMC layer schedules a cell broadcast (CB) message transferred from the core network and broadcasts the CB message to terminals positioned in a specific cell or cells.

The PDCP layer is located above the RLC layer. The PDCP layer is used to transmit network protocol data, such as IPv4 or IPv6, efficiently on a radio interface with a relatively small bandwidth. For this purpose, the PDCP layer reduces unnecessary control information used in a wired network, namely, a function called header compression is performed.

The radio resource control (RRC) layer located at the lowest portion of the third layer (L3) is only defined in the control plane. The RRC layer controls the transport channels and the physical channels in relation to setup, reconfiguration, and the release or cancellation of the radio bearers (RBs). The RB signifies a service provided by the second layer (L2) for data transmission between the terminal and the UTRAN. In general, the set up of the RB refers to the process of stipulating the characteristics of a protocol layer and a channel required for providing a specific data service, and setting the respective detailed parameters and operation methods. Additionally, the RRC layer handles user mobility within the RAN, and additional services, e.g., location services.

The E-UTRA (Evolved UMTS Terrestrial Radio Access) system, also called a LTE (Long Term Evolution) system, is considered as involving the PS (Packet Switched) domain with only shared resources to be used. In this new context with faster delay and higher capacity requirements, the usage of LTE RACH (LTE Random Access Channel) should be somewhat different to the existing GSM and UMTS systems in order to meet access requirement specified for LTE. E-UTRA and LTE are related to the principles of Orthogonal Frequency Division Multiplexing (OFDM).

OFDM is based on the well-known technique of Frequency Division Multiplexing (FDM). In FDM, different streams of information are mapped onto separate parallel frequency channels. Each FDM channel is separated from the others by a frequency guard band to reduce interference between adjacent channels. The OFDM technique differs from traditional FDM in the ways that multiple carriers (called sub-carriers) carry the information stream, the sub-carriers are orthogonal to each other; (i.e. the bandwidths of the individual sub-carriers, are small and arranged so that the maximum of one carrier, corresponds with the first minimum of the adjacent carrier) and a guard time may be added to each symbol to combat the channel delay spread.

FIG. 2 shows an exemplary Frequency-Time representation of an OFDM signal. As can be seen, the signal may be comprised of multiple sub-carriers, each sub-carrier (having a particular bandwidth or frequency range) may carry data (or information) that are represented by symbols with guard intervals therebetween.

The multi-user system comprises both uplinks and downlinks. In the uplink, the network measures the attenuation at the different uplink sub-carriers. On the basis of the measurements made, the network distributes the sub-carriers which the different UEs have to use for uplink transmission. In the downlink, the UE measures the attenuation for each downlink sub-carrier. The result of the measurement is signaled to the network which distributes downlink sub-carriers for better UE reception. In a random access protocol, a UE transmits a known signal sequence (i.e. a specific coded signature) to a base station (Node B). For that, firstly, the UE listens for a pilot channel transmitted by the network, and after detection, the UE synchronizes to OFDM symbols transmitted by the network. Secondly, the UE listens to a broadcast system information channel for a random access sequence and a sub-carrier number assigned to a random access channel (RACH) and then transmits a random access sequence in the random access channel. After transmission for a number of cycles of the random access sequence, the UE checks whether or not, the network has granted the access.

A general overview of the W-CDMA random access procedure will now be considered.

The transport channel RACH and two physical channels PRACH and AICH, are involved in this procedure. The transport channels are the channels supplied from the physical layer to the protocol layer (MAC). There are several types of transport channels to transmit data with different properties and transmission formats over the physical layer. Physical channels are identified by code and frequency in FDD mode. They are normally based on a layer configuration of radio frames and timeslots. The form of radio frames and timeslots depends on the symbol rate of the physical channel. The radio frame is the minimum unit in the decoding process, consisting of 15 time slots. The time slot is the minimum unit in the Layer 1 bit sequence. Thus, the number of bits that can be accommodated in one time slot depends on the physical channel. The transport channel RACH (Random Access CHannel) is an uplink common channel used for transmitting control information and user data. It is applied in random access, and used for low-rate data transmissions from the higher layer. The RACH is mapped to the uplink physical channel called the PRACH (Physical Random Access CHannel). The AICH (Acquisition Indication CHannel) is a downlink common channel, which exists as a pair with the PRACH used for random access control.

The transmission of PRACH is based on a slotted ALOHA approach with fast acquisition indication. The UE selects randomly an access resource and transmits a RACH preamble part of a random access procedure to the network. The preamble is a short signal that is sent before the transmission of the RACH connection request message. The UE repeatedly transmits the preamble by increasing the transmission power every time the preamble is sent, until the UE receives an AI (Acquisition Indicator) on the AICH (Acquisition Indicator Channel), which indicates the detection of the preamble by the network. The UE stops the transmission of the preamble once it receives the AI, and sends the message part at the level of power equal to the preamble transmission power at that point, plus an offset signalled by the network. This random access procedure avoids a power ramping procedure for the entire message. Such power ramping procedure would create more interference due to unsuccessfully sent messages and it would be less efficient due to the larger delay since it would take much more time to decode the message before an acknowledgement could be given that it was received successfully.

The main characteristics of the RACH is that it is a contention based channel, which means that due to simultaneous access of several users, collisions may occur such that the initial access message cannot be decoded by the network. The UE can start the random-access transmission (both preambles and message) at the beginning of an access slot only. This kind of access method is therefore a type of slotted ALOHA approach with fast acquisition indication.

FIG. 3 shows an example of access slots in relation to the transmission of a preamble, a message, and an acquisition indicator (AI).

FIG. 4 shows an example of the number of RACH access slots and their spacing.

Referring to FIGS. 3 and 4, the time axis of both the RACH and the AICH is divided into time intervals, called access slots. There are 15 access slots per two frames (one frame is 10 ms length or 38400 chips) and they are spaced 1.33 ms (5120 chips) apart.

FIG. 5 shows an example of the reception of downlink AICH access slot by the UE and the transmission of uplink PRACH access slot by the UE. Namely, FIG. 5 shows the transmission timing relationship between the PRACH and AICH.

FIG. 6 shows a table with the available uplink access slots for different RACH sub-channels.

Referring to FIGS. 5 and 6, the information on what access slots are available for random-access transmission and what timing offsets to use between RACH and AICH, between two successive preambles and between the last preamble and the message is signalled by the network. For example, if the AICH transmission timing is 0 or 1, it will be sent 3 or 4 access slots after the last preamble access slot transmitted, respectively.

Also, referring to FIGS. 5 and 6, the timing at which the UE can send the preamble is divided by random access sub-channels. A random access sub-channel is a subset comprising the combination of all uplink access slots. There are 12 random access sub channels in total. Random access sub-channel consists of the access slots.

FIG. 7 shows an exemplary format of preamble signatures. The preamble is a short signal that is sent before the transmission of the RACH message. A preamble consists of 4096 chips, which is a sequence of 256 repetitions of Hadamard codes of length 16 and scrambling codes assigned from the upper layer. The Hadamard codes are referred to as signature of the preamble. There are 16 different signatures and a signature is randomly selected (from available signatures sets on the basis of ASC) and repeated 256 time for each transmission of preamble part.

FIG. 8 shows an exemplary structure of a random access message part. The message part is spread by short codes of OVSF codes that are uniquely defined by the preamble signature and the spreading codes as the ones used for the preamble signature. The message part radio frame of length 10 ms is divided into 15 slots, each consisting of 2560 chips. Each slot consists of a data part and a control part that transmits control information (pilot bits and TFCI). The data part and the control part are transmitted in parallel. The 20-mslong message part consists of two consecutive message part radio frames. The data part consists of 10*2 k bits (k=0, 1, 2, 3), which corresponds to the Spreading Factor (SF=256, 128, 64, 32).

FIG. 9 shows an exemplary format (structure) of the AICH. The AICH consists of a repeated sequence of 15 consecutive access slots, each of length 40 bit intervals (5120 chips). Each access slot consists of two parts, an Acquisition Indicator (AI) part consisting of 32 real-valued signals a0, . . . , a31 and a part of duration 1024 chips where transmission is switched off.

When the network detects transmission of an RACH preamble in an RACH access slot with a certain signature, it repeats this signature in the associated AICH access slot. This means that the Hadamard code used as signature on RACH preamble is modulated onto the AI part of the AICH. The acquisition indicator corresponding to signature can take the values +1, −1, and 0, depending on whether a positive acknowledgement a negative acknowledgement or no acknowledgement is given to a specific signature. The positive polarity of signature indicates that the preamble has been acquired and the message can be sent. The negative polarity indicates that the preamble has been acquired and the power ramping procedure shall be stopped, but the message shall not be sent. This negative acknowledgement is used when, due to a congestion situation in the network, a transmitted message cannot not be processed at the present time. In this case, the access attempt needs to be repeated some time later by the UE.

Regarding the random access procedure on protocol layer (L2), the network decides whether the mobile station is to be permitted use of a radio access resource based primarily upon the access class to which the UE belongs. A specified priority level is implied by the Access Class (AC) which is stored on the UE SIM card.

Hereafter, certain aspect of access control will be described. It should be noted that the relevant standard related to this matter is 3GPP TS 22.011.

Regarding the purpose of access control, under certain circumstances, it will be desirable to prevent UE users from making access attempts (including emergency call attempts) or responding to pages in specified areas of a PLMN (Public Land Mobile Network). Such situations may arise during states of emergency, or where 1 of 2 or more co-located PLMNs has failed. Broadcast messages should be available on a cell-by-cell basis indicating the class(es) of subscribers barred from network access. The use of this facility allows the network operator to prevent overload of the access channel under critical conditions. It is not intended that access control be used under normal operating conditions.

For allocation, all UEs are members of one out of ten randomly allocated mobile populations, defined as Access Classes 0 to 9. The population number can be stored in a SIM/USIM for the UE. In addition, mobiles may be members of one or more out of 5 special categories (Access Classes 11 to 15), which also may be stored in the SIM/USIM. These may be allocated to specific high priority users as follows. (This enumeration is not meant as a priority sequence):

Class 15—PLMN Staff;
Class 14—Emergency Services;
Class 13—Public Utilities (e.g. water/gas suppliers);
Class 12—Security Services;
Class 11—For PLMN Use.

For operation, if the UE is a member of at least one Access Class which corresponds to the permitted classes as signalled over the air interface, and the Access Class is applicable in the serving network, access attempts are allowed. Otherwise access attempts are not allowed.

Access Classes are applicable as follows:
Classes 0~9—Home and Visited PLMNs;
Classes 11 and 15—Home PLMN only;
Classes 12, 13, 14—Home PLMN and visited PLMNs of home country only.

Any number of these classes may be barred at any one time.

For emergency calls, an additional control bit known as Access Class 10 is also signalled over the air interface to the UE. This indicates whether or not network access for Emergency Calls is allowed for UEs with access classes 0 to 9 or without an IMSI. For UEs with access classes 11 to 15, Emergency Calls are not allowed if both Access Class 10 and the relevant Access Class (11 to 15) are barred. Otherwise, Emergency Calls may be allowed.

Hereafter, the mapping of Access Classes (AC) will be described. It should be noted that the relevant standard related to this matter is 3GPP TS 25.331.

In UMTS, the Access Classes are mapped to Access Service Classes (ASC). There are eight different priority levels defined (ASC 0 to ASC 7), with level 0 being the highest priority.

For mapping of Access Classes to Access Service Classes, the Access Classes shall only be applied at initial access, i.e. when sending an RRC CONNECTION REQUEST message. A mapping between Access Class (AC) and Access Service Class (ASC) shall be indicated by the information element AC-to-ASC mapping in System Information Block type 5. The correspondence between AC and ASC is indicated in FIG. 10.

FIG. 10 shows a table showing the correspondence between AC and ASC. The $n^{th}$ IE designates an ASC number i in the range 0-7 to AC. If the ASC indicated by the $n^{th}$ IE is undefined, the UE behaviour is unspecified.

For random access, the parameters implied by the respective ASC shall be employed. In case the UE is a member of several ACs, it shall select the ASC for the highest AC number. In connected mode, AC shall not be applied.

An ASC consists of a subset of RACH preamble signatures and access slots which are allowed to be used for this access attempt and a persistence value corresponding to a probability $Pv \le 1$ to attempt a transmission. Another important mechanism to control random access transmission is load control mechanism which allows reducing the load of incoming traffic when the collision probability is high or when the radio resources are low.

In order to improve spectral efficiency, a new uplink (transmission from a UE to network) scheme is under study within the 3GPP Long Term Evolution framework. For the uplink, a multi-carrier (OFDMA) system or a single carrier (localized or distributed FDMA) system with cyclic prefix and frequency domain equalization could be a candidate. The different carriers could be distributed to the UEs. In these systems, a set of sub-carrier frequencies is assigned to each uplink communication link within a cell. The set of sub-carrier frequencies allocated to each communication link is chosen from all sub-carrier frequencies available to the system. In order to reach spectral efficiency targets, a new air interface is assumed to achieve a frequency re-use of 1 like WCDMA does.

DISCLOSURE OF INVENTION

Technical Problem

In such an orthogonal system, the intra-cell interference between sub-carriers within the same cell does not occur.

However, it is possible that inter-cell interference occurs, caused by the use of the same sub-carrier frequency in adjacent cells.

Technical Solution

In order to maximize the probability of correct detection and minimize false detection of a random access sequence, the present invention performs assignment of sub-carrier frequencies to RACH communications links based on interference coordination technique.

The present disclosure provides a method of determining random access resources performed by a mobile terminal, the method comprising: receiving information on available random access resources from a network; deciding how to derive the random access resources to be allowed based on default values or information received from the network; measuring received signal quality of at least one of a cell to be accessed and a neighboring cell; and deriving the allowed random access resources based on the deciding and the measuring.

Also, the present disclosure provides a method of determining random access resources performed by a network, the method comprising: transmitting information on available random access resources to a terminal; and transmitting at least one parameter related to a measurement of a downlink radio signal to allow the terminal to decide how to derive the random access resources to be allowed.

BRIEF DESCRIPTION OF THE DRAWINGS

FIG. 4 shows an example of the number of RACH access slots and their spacing.

FIG. 5 shows an example of reception of DL AICH and UL PRACH by a UE.

FIG. 6 shows a table with the available uplink access slots for different RACH sub-channels.

FIG. 7 shows an exemplary format of preamble signatures.

FIG. 8 shows an exemplary structure of a random access message part.

FIG. 9 shows an exemplary format (structure) of the AICH.

FIG. 10 shows a table showing the correspondence between AC and ASC.

FIG. 17 shows an example of RACH frequency planning within the network deployment for fractional reuse.

MODE FOR THE INVENTION

One aspect of the present disclosure is the recognition by the present inventor regarding the problems and drawbacks of the related art described above. Based upon such recognition, the features of the present disclosure have been developed.

Although the following description will refer to optimized RACH procedures of UMTS merely for the sake of explanation, the features of the present disclosure are clearly intended to be applicable to various other types of communication methods and systems that would benefit from employing the particular features of the present disclosure.

Figure 1:
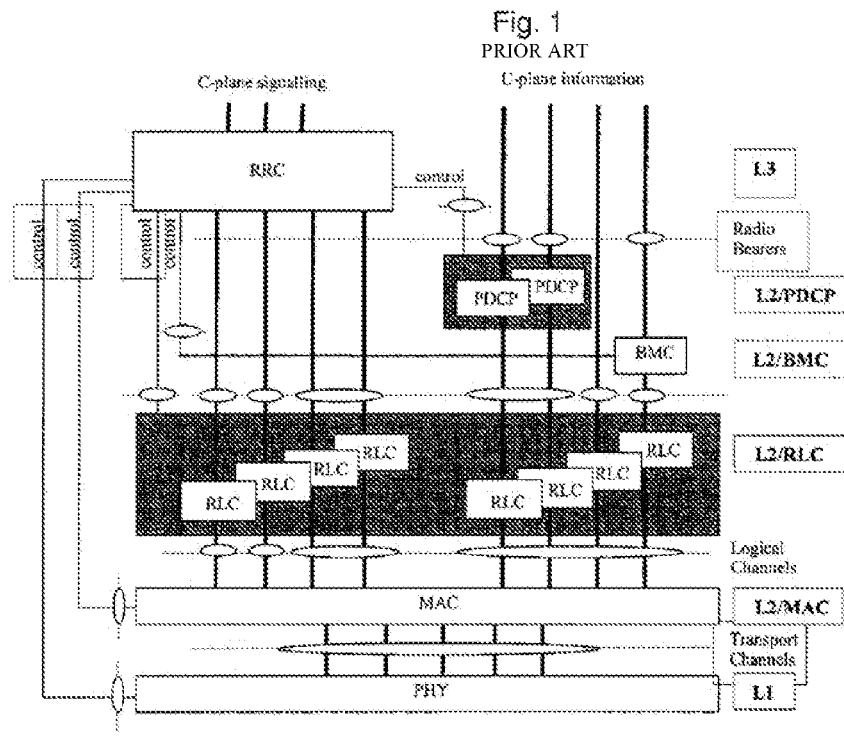
FIG. 1 shows the radio interface protocol architecture according to the 3GPP radio access network standards.
Figure 2:
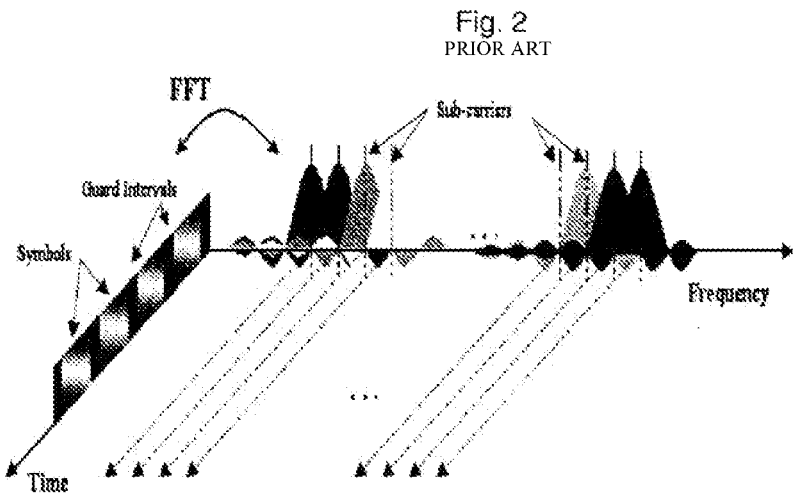
FIG. 2 shows an exemplary Frequency-Time representation of an OFDM signal.
Figure 3:
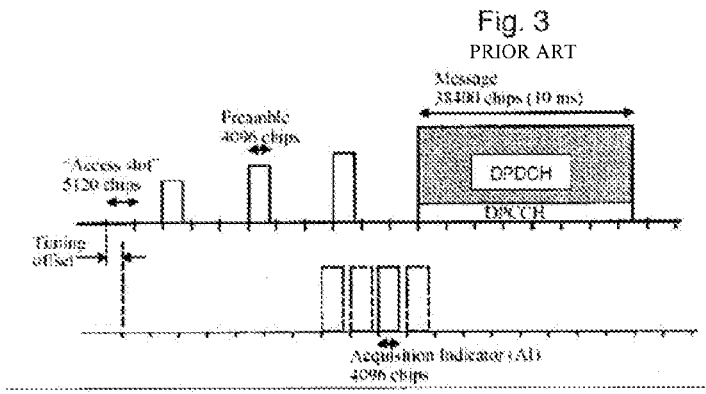
FIG. 3 shows an example of access slots in relation to the transmission of a preamble, a message, and an acquisition indicator (AI).
Figure 11:
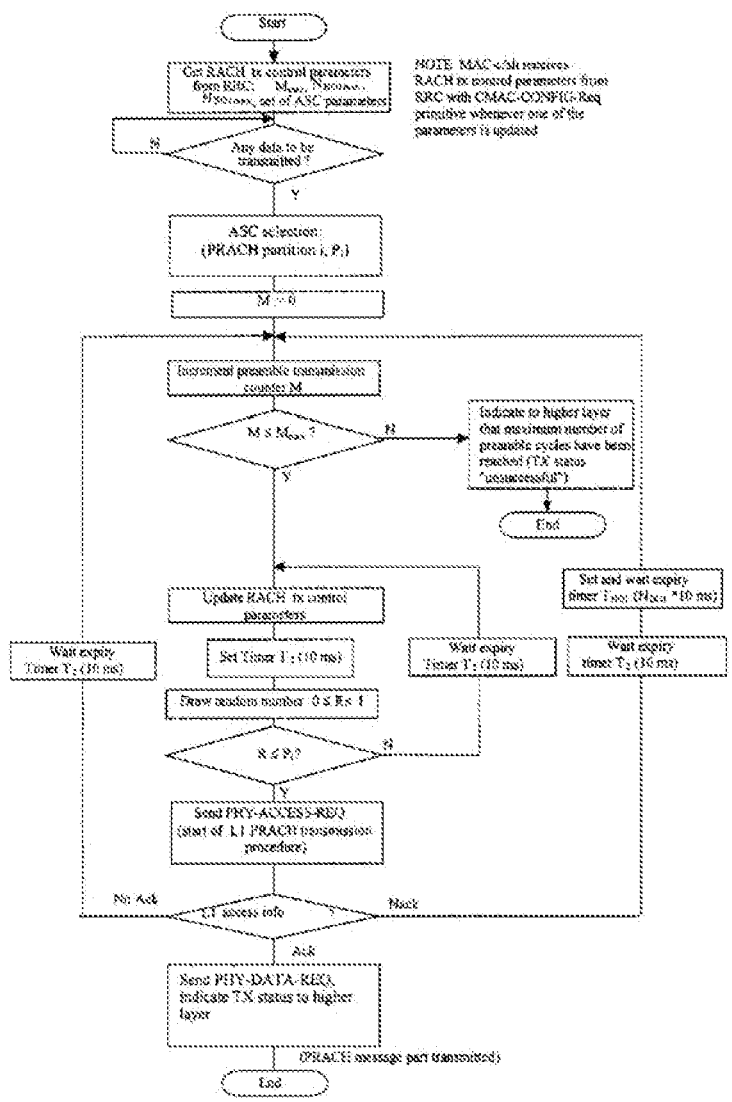
FIG. 11 shows a flow chart of an exemplary control access procedure.

FIG. 11 shows a flow chart of an exemplary control access procedure. It should be noted that the relevant standard related to this matter is 3GPP TS 25.321.

The control access procedure may be performed in the following five steps:

(1) Existing specifications provide many RACH transmission control parameters which are stored and updated by the UE based on system information broadcasted by the network. The RACH transmission control parameters include Physical RACH (PRACH), Access Service Class (ASC), maximum number of preamble ramping cycles Mmax, range of backoff interval for timer TBO1, given in terms of numbers of transmission 10 ms time intervals NBO1max and NBO1min, applicable when negative acknowledgement on AICH is received.

(2) The UE maps the assigned AC to an ASC and n a count value M is set to zero.

(3) The count value M is incremented by one. Next, the UE determines if the count value M representing the number of transmission attempts exceeds the maximum number of permitted RACH transmission attempts Mmax. If so, then the UE treats the transmission as unsuccessful.

(4) However, if M is less than or equal to the maximum number of permitted RACH transmission attempts Mmax, then the UE updates the RACH transmission control parameters. In the next step, a 10 ms timer T2 is set. The UE decides whether to attempt transmission based on the persistence value Pi associated with the ASC selected by the UE. Specifically, a random number Ri is generated between 0 and 1. If the random number Ri is less than or equal to the persistence value Pi, the UE attempts to transmit over an assigned RACH resources, otherwise, the UE waits till the 10 ms timer T2 expires and perform again the procedure in step (4).

(5) When one access attempt is transmitted, the UE determines whether the network responds with an ACKnowledgement (ACK), a Non ACKnowledgment (NACK), or no response. If no response is received from the network, after the timer T2 expires the process is performed again from step (3). If a NACK, indicating a failed receipt of the transmission by the network often due to collision, is received, then the UE waits for the timer T2 to expire then generates a back off value NBO1 randomly chosen between the maximum and minimum back off values NBO1max and NBO1min associated with the PRACH assigned to the UE. The UE then waits a back off interval TBO1 equal to 10 ms times the back off value NBO1 before to perform again the process from step (3). If an ACK, indicating receipt of the UE transmission by the network, is received, then the UE begins the message transmission.

Hereafter, the random access procedure on the physical layer (L1) will be described.

The physical random access procedure is initiated upon request from the MAC sub layer (L2).

Before the physical random-access procedure can be initiated, Layer 1 shall receive the following information from the higher layers (RRC):

The preamble scrambling code.

The message length in time, either 10 or 20 ms.

The AICH_Transmission_Timing parameter [0 or 1].

The set of available signatures and the set of available RACH sub-channels for each Access Service Class (ASC).

The power-ramping factor Power Ramp Step [integer>0].

The parameter Preamble Retrans Max [integer>0].

The initial preamble power Preamble_Initial_Power.

The Power offset P p–m=Pmessage-control Ppreamble, measured in dB, between the power of the last transmitted preamble and the control part of the random-access message.

The set of Transport Format parameters. This includes the power offset between the data part and the control part of the random-access message for each Transport Format.

At each initiation of the physical random access procedure, Layer 1 shall receive the following information from the higher layers (MAC):

The Transport Format to be used for the PRACH message part.

The ASC of the PRACH transmission.

The data to be transmitted (Transport Block Set).

The physical random-access procedure is performed according to the procedures (steps) below:

1. In the random access sub-channel that can be used for the ASC concerned, one access slot is chosen randomly from access slots that can be used in the next full access slot sets2. If there are no access slots available, one access slot is chosen randomly from access slots that can be used in the next full access slot sets.

2. One signature is randomly chosen from the set of available signatures within the given ASC.

3. The preamble retransmission counter is set at Preamble Retrans Max, which is the maximum number of preamble retransmission attempts.

4. The preamble transmission power is set at Preamble Initial Power, which is the initial transmission power of the preamble.

5. The preamble is transmitted on the basis of the chosen uplink access slot, signature and set transmission power.

6. If no ACK or NACK corresponding to the selected signature is detected in the downlink access slot corresponding to the selected uplink access slot.

The next available access slot is selected from the random access sub-channel within the given ASC.

A new signature is randomly selected from the available signatures within the given ASC.

The preamble transmission power is increased by Power Ramp Step, which is the step width of the power ramping.

The preamble retransmission counter is reduced by 1.

The procedures from step 5 are repeated for the duration in which the preamble retransmission counter exceeds 0. When the retransmission counter reads 0, the higher layer (MAC) is informed of the fact that ACK has not been received on AICH, and the random access control procedures in the physical layer are finished.

7. If NACK corresponding to the selected signature is detected in the downlink access slot concerned, the higher layer (MAC) is informed of the fact that NACK has been received on AICH, and the random access control procedures in the physical layer is finished.

8. The random access message is transmitted 3 or 4 uplink access slots after the uplink access slot of the last transmitted preamble depending on the AICH transmission timing parameter. The transmission power of the control channel of the random access message is set at a level higher than the transmission power of the last preamble transmitted by power offset.

9. The higher layer is informed of the transmission of the random access message, and the random access control procedures in the physical layer are finished.

Figure 12:
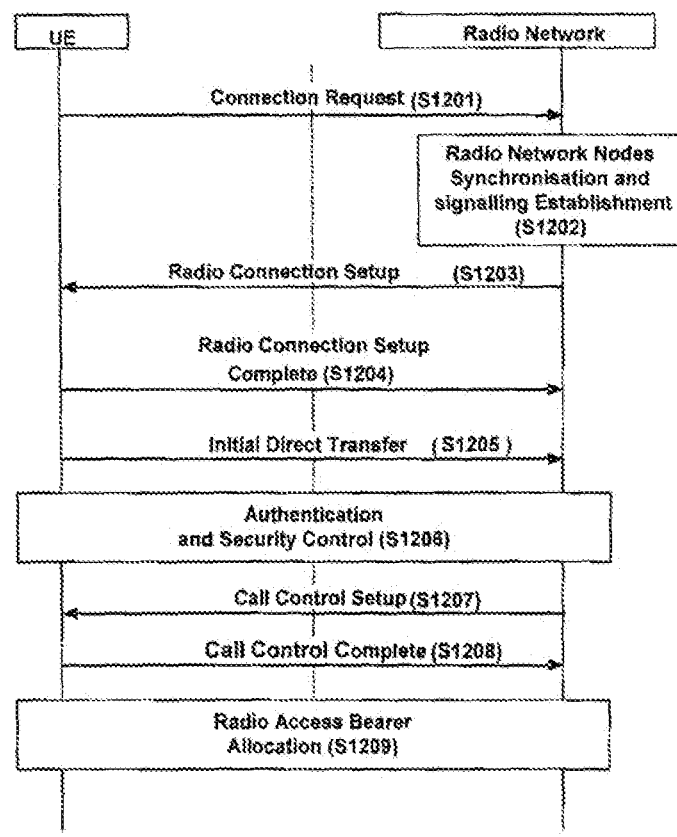
FIG. 12 shows an exemplary signal flow for Signalling Establishment.

FIG. 12 shows an exemplary signal flow for Signalling Establishment.

Once the PRACH power control preambles have been acknowledged the RRC Connection Request message can be transmitted (S1201). It contains the reason why the connection is requested.

Depending on the request reason radio network makes decision of kind of resources to reserve and perform synchronization and signalling establishment among radio network nodes (i.e. Node B and serving RNC) (S1202). When the radio network is ready it sends to the UE the Connection Setup message conveying information about radio resource to use (S1203). The UE confirms connection establishment by sending the Connection Setup Complete message (S1204). When the connection has been established, the UE sends an Initial Direct Transfer message that may include various types of information, such as the UE identity, current location, the kind of transaction requested, and the like (S1205). Here, the current location may indicate the PLMN to which the UE requests the signalling connection to be established. An exemplary list of information elements that may be carried by the Initial Direct Transfer message are defined in 3GPP TS 25.331.

Then the UE and network authenticate each other and establish security mode communication (S1206). The actual set up information is delivered through the Call Control Setup message (S1207). It identifies the transaction and indicates the QoS requirements. Upon receiving the message the network starts activities for radio bearer allocation by checking if there are enough resources available to satisfy the requested QoS. If yes, the radio bearer is allocated according to the request. If not, the network may select either to continue allocation with lowered QoS value, or it may select to queue the request until radio resources become available or to reject the call request (S1208, S1209).

In wireless systems, a random access (performed on RACH, random access channel) is the method used by the UE to initiate a call, to establish signaling and short data transfer with the network.

As described above, in these systems, no method exists for coordinating the assignment of sub-carrier frequencies to RACH communications links based on interference coordination technique, in order to maximize the probability of correct detection and minimize false detection of random access sequence As such, the present disclosure provides the following conceptual ideas. The first aspect of the present disclosure provides a method of selecting RACH channels dedicated to random access, the method comprising planning a set of uplink sub carrier groups (RACH channels as described below) according to the path loss level or other measurements. Other metrics in correlation with path loss like SNR, received signal level (Rx level), interference level, etc. are possible candidates.

Figure 13:
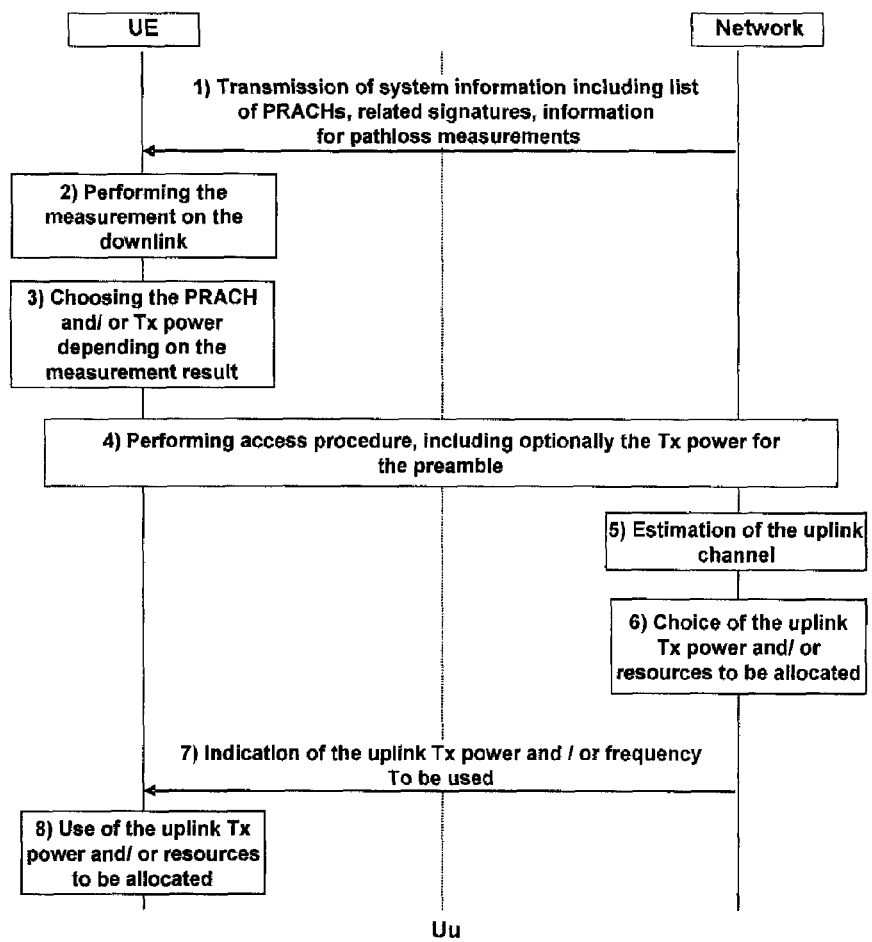
FIG. 13 shows an exemplary procedure according to the present disclosure.

FIG. 13 shows an exemplary procedure according to the present disclosure. The processing between the UE (terminal) and the network is shown.

The network transmits system information to the UE (Step 1). System information may include a list of PRACHs, related signatures, information for path loss measurements, and the like. Then, the UE performs measurements on the downlink (Step 2). The UE then chooses the PRACH and/or transmission power depending on the measurement result (Step 3).

Thereafter, the UE and the network cooperate to perform access procedures (Step 4). Here, the transmit power for the preamble may be optionally included. Then, the network performs estimation of the uplink channel (Step 5). Thereafter, the network chooses the uplink transmit power and/or resources to be allocated (Step 6). The network then transmits to the UE, an indication of the uplink transmit power and/or frequency to be used (Step 7). The UE then uses the uplink transmit power and/or resources to be allocated (Step 8). It is clear that additional and/or alternative steps may be performed.

Figure 14:
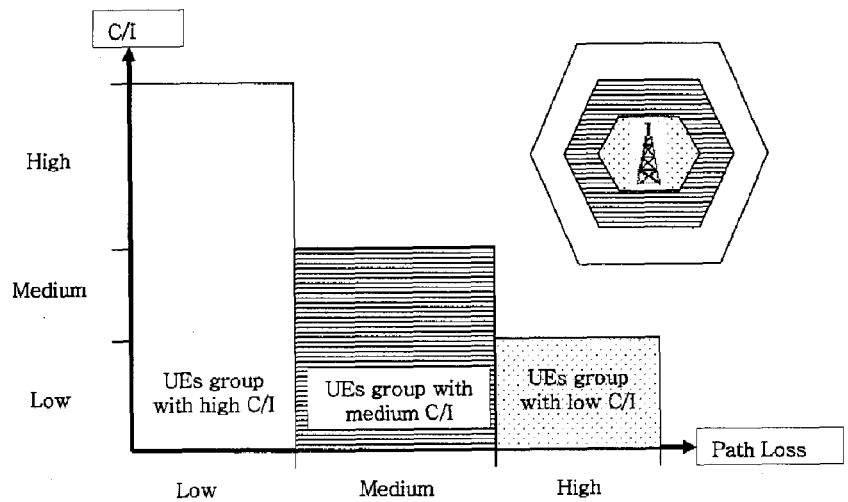
FIG. 14 shows an example of RACH frequency planning within one cell.

FIG. 14 shows an example of RACH frequency planning within one cell. The UEs located in certain portions of a single cell may have different degrees of path loss and levels of carrier-to-interference ratio (C/I). With respect to a single cell, three regions may exist. Namely, the central region may be for UEs with low C/I but high path loss; a boundary (or periphery) region may be for UEs with high C/I but low path loss; and an intermediate region (i.e., between the central region and the boundary region) may be for UEs with medium C/I and medium path loss. It is clear that more or less degrees path loss and/or levels of C/I may be used.

Here, it should be noted that the depicted hexagons are merely exemplary for representing cells of a cellular network. It can be understood that the actual shapes of the cells may vary due to various factors, such as geographic location, signal usage, desired coverage area, and the like.

Figure 15:
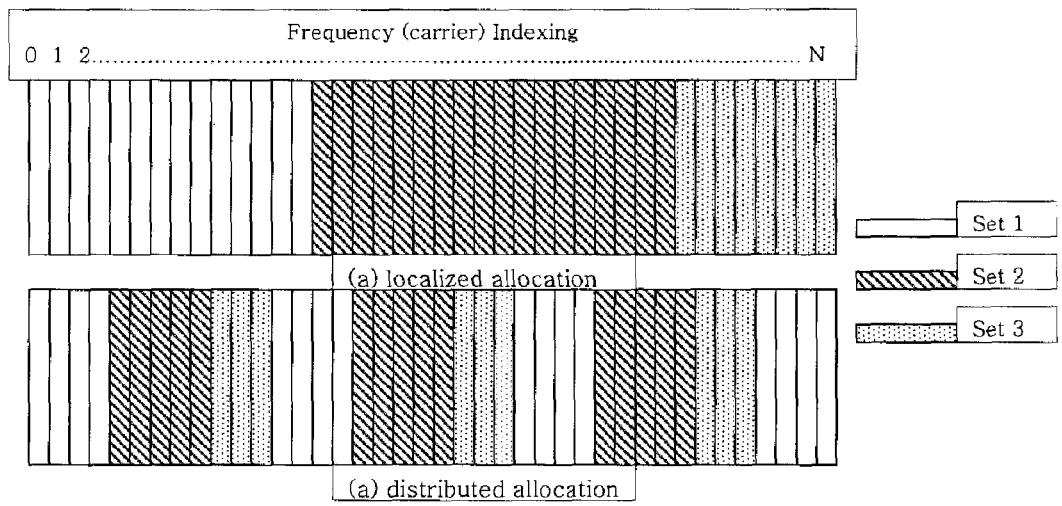
FIG. 15 shows an example of RACH radio frequencies (carrier) arrangement.

FIG. 15 shows an example of RACH radio frequencies (carrier) arrangement. The RACH radio frequencies (with indexing from 0 through N) may be divided into three sets (Set 1, Set 2, Set 3). These sets of RACH radio frequencies may be allocated in (a) a localized manner or in (b) a distributed manner. It is clear that other types of allocation may be employed.

Figure 16:
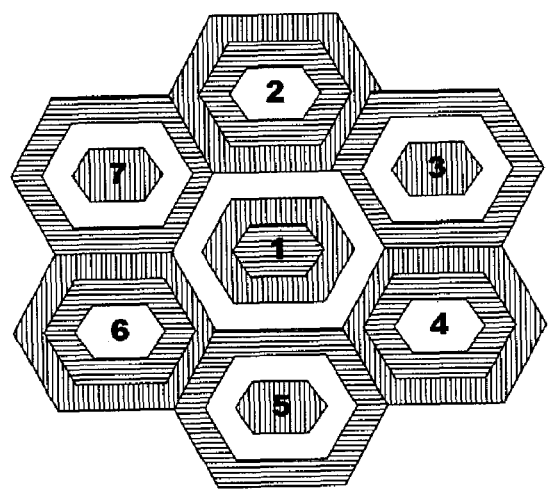
FIG. 16 shows an example of RACH frequency planning within the network deployment for frequency reuse.
Figure 16:
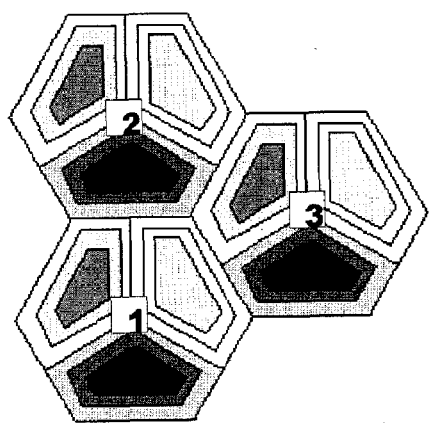

FIG. 16 shows an example of RACH frequency planning within the network deployment for frequency reuse. Referring back to FIGS. 14 and 15, the cells may have different configurations and planned in a particular manner. For example, cell 1 may have three regions; a central region for UEs with high C/I but low path loss, a boundary region for UEs with low C/I but high path loss, and an intermediate region for UEs with medium C/I and medium path loss. Around cell 1, there may be six cells. A first set of cells (cells 2, 4, 6) may have a central region for UEs with low C/I but high path loss, a boundary region for UEs with medium C/I and medium path loss, and an intermediate region for UEs with high C/I and low path loss. Also, a second set of cells (cells 3, 5, 7) may have a central region for UEs with medium C/I and medium path loss, a boundary region for UEs with high C/I and low path loss, and an intermediate region for UEs with low C/I and high path loss. The cells of the first and second sets may alternate as shown. However, it is clear that other cell arrangements, as well as additional and/or alternative regions for each cell are possible.

FIG. 17 shows an example of RACH frequency planning within the network deployment for fractional reuse. Here, fractional reuse may refer to when each cell may be divided into three sectors, where each sector may have a central region, an intermediate region, and a boundary region. Three cells (Cells 1, 2, 3) may be planned as shows in FIG. 17.

The features of the present disclosure will be explained in more detail with reference to FIGS. 13 through 17.

The path loss expresses the attenuation undergone by the signal between the transmitter and receiver due to many effects such as distance free-space loss and several faded paths due to reflection, refraction, absorption, etc. In the same manner as the related art, the UE reads in system information on a broadcast channel the power level used on the common pilot channel. The present uplink interference level could be also read in the same way. It measures the received power on the common pilot channel. By subtracting the received pilot power from the transmitted pilot power, an estimate of the path loss can be obtained.

$$\text{Path loss}_{db} = T_x\text{level} - R_x\text{level}$$

where $T_x$ level is the effective transmit power level (taking into account maximum output power and all gain and losses, i.e.: gain of transmitted antenna, cable losses), and $R_x$ level is the measured power level (taking into account the gain of the received antenna and interference received level).

Alternatively, also the difference of a measurement of the target cell and the measurement of neighbouring cells could be used in order to decide on the RACH channel that could be used.

Out of the set of available RACH channels, the UE selects the set of allowed channels to be used as shown below.

Set of RACH channels allowed=$f$(any metrics in correlation with path loss or other measurements as described above of one or several cells, available RACH channels)

Out of the set of allowed channels, the UE could then select one RACH channel based on any algorithm.

RACH channel=$f$(UE decision, e.g. hash function on UE-ID, random function, etc.)

With the estimated path loss and interference power level the UE can calculate the necessary transmit power needed to achieve a certain SNR at the network side. This SNR target should be indicated by the network. During the RACH procedure it would be possible to indicate to the network the used Tx power/a range of the path loss or other measurement in order to allow the network to choose the best uplink resources (i.e. frequency and/or time and/or code pattern).

Another aspect of the present disclosure is to provide a particular RACH procedure. Namely the present disclosure may be implemented in the following manner.

A different RACH radio frequency or set of radio frequencies are planned within the cell according to a particular criteria, which could be QoS, path loss, SNR, received signal level (Rx level), interference level, etc. Different thresholds could be applied for different RACH resources. The particular threshold, determines which RACH resources are allowed for use. Then the UE selects one of the RACH resources, according to a specific method to perform random access.

Some specific examples applicable to the present disclosure are as follows:

RACH channels can be defined through the various combinations of radio resources in frequency domain (e.g. by a specific sub carriers), in time domain (e.g. time durations defined by start and stop instants), in code domain (e.g. defined by a specific code sequence), or mixtures thereof. For example RACH channel can use a combination of frequency and time division pattern which could be defined as a sequence of frequencies and timeslots. The frequency sequence is determined by that in a given cell there is, for a RACH channel assigned to a particular UE a correspondence between frequency and radio frame. A given RACH channel could use the same or different timeslot in every radio frame. The timeslot sequence is defined by a timeslot number and/or frame number sequence. These parameters should be broadcasted (or derived from parameters broadcasted) by the network.

RACH resources in frequency domain can be defined as a subset of M allowed frequencies allocated from a larger group of N frequencies that are available for communication links within the cell. The number M depends on the required RACH capacity and could change over time, for example when the network detects that a random access channel is used, the used frequency could be removed from the allowed channel or may just be indicated as non-free or busy. At the network side, the subset of M allowed frequencies can be arranged according several path loss threshold levels, either in a localized way where frequencies are grouped together over part of the entire band or in a distributed way where the frequencies are equally spaced over the whole band as shown in FIG. 14. Path loss at a distance is known to follow a so-called distance power law, i.e. the received signal decreases as $d^{-\alpha}$ and depends to some extend on the frequency band in use, the antenna height and shape, both of the UE and the base station. Regarding path loss, there exist a number of experimental models, of which the model by OKUMURA & HATA being the most famous. This model basically describes that the path loss increases as the distance increases. This means that the received signal strength is greater in the vicinity of the cell center and decreases with distance from the cell center. Thus, at the network side, for a given frequency band, a given antenna height, a given environment, the following very simple formula can be used in order to arrange M allowed frequencies according to several path loss levels:

$$\text{Path loss } dB = C + 10\alpha \log d$$

where C is a constant, d is a distance and $\alpha$ is the propagation exponent with the value depending of channel model and is usually in a range of 2 to 4.

One main concept of the present disclosure is that at the UE side, each UE uses different RACH channels according to the path loss (SNR, received signal level (Rx level), interference level) of a received signal in the downlink as shown in FIG. 13. Each UE within the cell estimates the path loss. According the estimated path loss the UE determines which frequency subsets are allowed to perform random access. This could be done e.g. based on thresholds broadcast on system information, e.g. for each RACH channel the minimum/maximum measured value could be given. Thus different groups of UEs can be created in this way using different frequency or sets of frequencies, as shown in FIG. 15.

RACH resources in time domain could be defined from a predetermined number of time offsets indicating when a UE can start the random access procedure. In this example where RACH resources are defined through the combinations in frequency and time domain, the RACH channel could consist of M RACH allowed frequencies (as described above) mapped on the T RACH time offsets. There could be defined per cycle (the cycle could be one or more radio frames), S time offsets per allowed frequencies. In order to determine the S available time offsets for each allowed frequency, the following formula may be applied:

$$TimeOffset = \left[AllowedFrequencie_j + \left(k \times \frac{T}{S}\right)\right] \% \ T$$

with: $j = 0, 1, 2, 3, \ldots M; k = 1, 2, 3, \ldots S$

Here, the mathematical symbol % refers to the so-called modulo operation that returns the reminder after division by the divisor.

On the other hand, per M allowed frequencies cycle, each time offset could be de fined in order to appear in C different frequencies. In order to determine in which frequencies it appears, the following formula may be applied:

$$AllowedFrequencie = \left[TimeOffset_i + \left(n \times \frac{M}{C}\right)\right] \% \ M$$

with: $i = 0, 1, 2, 3, \ldots T; n = 0, 1, 2, 3, \ldots C$

Here, the mathematical symbol % refers to the so-called modulo operation that returns the reminder after division by the divisor.

The random access procedure may involve the following elements:

In the uplink, it consists of one or more access preambles (AP) and/or collision preambles (CP) and/or message parts that contain data and control information. The access preamble is a predefined sequence called a signature. There could be $Z_{max}$ of available access signatures. All signatures can in principle be used for a random access (if not prohibited by the system). It could be possible to detect several access attempts with different signatures simultaneously, and also acknowledge them on the access indicator channel (AICH) simultaneously. Collision detection preambles may be sent for collision detection. Collision detection preambles may be sent for collision detection before the message is transmitted. A collision detection signature could be shared with the access signature or be completely different. In case where a collision detection preamble is not used, collision resolution could be done (performed) by a higher layer after the message part is received. Note that in the case of UE based decision, the AP and CP could carry additional information like the channel which will be used for transmission, transmission power level, present downlink interference level, etc.

In the downlink, one or more access indicators (AI) could be sent. The AI signal is transmitted from the network in response to the access preamble detection. When operating properly, the network recognizes an access preamble from the UE and responds with an AI to establish a communication link. The access indicator is defined such that it identifies the signature that it responds to, and one implementation could be to use the identical signature sequence as the access preamble to which the response belongs. In the case where the collision detection preamble is used, the collision indicator (CI) could be used for supporting the collision detection function. Similarly, as the AI uses the AP signature sequence in response, the CI could use the CD signature sequence. Additional information could be included within the AI (and CI), as for instance: channel to use for message transmission, time waiting before message transmission called timing advance (TA) used to derive the correct value for timing advance that the UE has to use for the uplink transmission, transmission power level to use or present uplink interference level, and the like.

The random access procedure could be divided into several phases (phases A) through G) shown):

A) The UE shall start listening to the broadcast channel in order to obtain RACH control parameters. The purpose of the RACH control parameters is to provide parameters used to control the RACH utilization. Theses parameters should any of the following:

(1) Access Service Class (ASC) and associated persistence value (like the related art).

(2) The set of available RACH channels (or channel groups, the channels could be arranged in time-frequency domain as described above).

(3) The RACH Allocation Index Offset (RAIO), allowing calculation of the offset for the next RACH channel during preamble retransmission (can be seen as RACH hopping).

(4) The access preamble parameters:

a) The set of available access signatures. The same or different signatures can be allocated for each RACH channels group.

b) The maximum number of retransmissions allowed.

c) A parameter used for calculation of the minimum number of time-offsets between the transmission of two preambles.

d) The preamble power, whether the preamble power ramping is not used, it could be the same for each preamble retransmission e) If the preamble power ramping is used:

i) The initial preamble power ii) The power step between preambles power.

(5) If collision resolution is performed in physical layer, the collision preamble parameters, they could be like access preamble parameters with same or different parameters values.

(6) The Power offset between the access (or collision) preamble part and the message part.

(7) The number of time-offsets to spread transmission of the message part.

(8) The present uplink interference level could be indicated also.

(9) For each uplink channel, thresholds should be given for the downlink measurement object (e.g. minimum/maximum measured value, where the measured value could be any of path loss, SNR, received signal level (Rx level), interference level, etc, or differences of the measured values between different cells, e.g. difference between the cell with the RACH channel and a neighboring cell).

(10) Offsets for the calculation of the measured values, e.g. difference of the pilot power of the current and the neighboring cell etc.

B) The UE measures the received power on the common pilot channel. By subtracting the received pilot power from the transmitted pilot power, it can obtain an estimate of the path loss. With estimated path loss UE knows which RACH channels groups are allowed to be used.

C) The UE selects randomly one of RACH channel from the group it allows to use. Furthermore, the access preamble signatures are also selected randomly from among of available signatures.

D) An access preamble is sent with the selected signature. It could include additional information (in a case of UE based decision) on the next RACH channel which will be used for transmission, transmission power level, present downlink interference level, etc.

E) The UE decodes the acquisition indicator (AI) to see whether the network has detected the access preamble.

F) In case no AI is detected, the UE could select another signature and if power-ramping is used, the UE increases the access preamble transmission power by steps given by the network; else the same power level could be kept for preamble retransmission. The access preamble could be retransmitted either:

(1) in the next available RACH channel from the group;

(2) in the RACH channel according RAIO (RACH Allocation Index Offset);

(3) in the same RACH channel as previous transmission; or (4) in the RACH channel from another group if no prohibited by the system.

G) When an AI is detected, the UE either starts a collision detection preamble (if collision resolution is performed on physical layer) or message transmission (if collision resolution is performed on a higher layer).

(1) In a case of collision detection preamble, after an AI is detected, a CP with the same power level as the last AP is transmitted with another signature selected randomly. The CP could be transmitted in one of the RACH channels as described above (see previous point on access preamble retransmission). The network is expected to echo the CP signature on the CI and in this way reducing the collision probability on physical layer (L1).

(2) The message part could be transmitted either in the RACH channel according the one of method as for preambles transmission or in another specific channel which could be indicated in a AI or CI (see above regarding the additional information elements which could be included in the AI and/or CI) or by another network channel. The random access message is transmitted according the number of time-offsets to spread transmission of the message part as indicated by the network. Note that HARQ methods could be used for data block acknowledgement during this period.

The concepts and features of the present disclosure are not limited to wireless systems, but has applicability to any communication system having an access protocol for communication resources.

To summarize, the present disclosure provides the following features: A method for accessing an uplink channel, may comprise estimating the quality of a received signals and based on this estimation selecting an uplink channel from a set of available uplink channels. The UE may estimate the quality based on pilot bits sent in the downlink. The UE may estimate the difference of the quality of the current and the neighboring cell. The network may send to the UE, ranges of qualities that must be measured by the UE in order to be allowed to access an uplink channel. A method for managing the use of different uplink channels may comprise transmission of information on the requirements of downlink measurements that need to be fulfilled in order to be allowed to access a specific uplink channel.

The present disclosure provides a method of determining random access resources performed by a mobile terminal, the method comprising: receiving information on available random access resources from a network; deciding how to derive the random access resources to be allowed based on default values or information received from the network; measuring received signal quality of at least one of a cell to be accessed and a neighboring cell; and deriving the allowed random access resources based on the deciding and the measuring.

The information received from the network may be received in a broadcast, multicast or dedicated manner. The received signal quality may comprise at least one of energy of carrier/spectral noise density, signal-to-noise ratio, carrier/interference, and path loss. The random access resources may comprise: sets of any combination of time, frequency, and code. The method wherein a RACH channel comprises M RACH allowed frequencies mapped on the T RACH time offsets. The method wherein per one cycle, S time offsets per allowed frequencies are defined, wherein each cycle comprises one or more radio frames. The method wherein per M allowed frequencies cycle, each time offset is defined in order to appear in C different frequencies. The method wherein one or more available random access resources is allowed to be used if a measurement of the received signal quality of at least one of the cell to be accessed and the neighboring cell is larger or smaller than a threshold value. The method may further comprise: performing an access procedure comprising a step of transmitting an access burst, which could be re-transmitted based on the allowed random access resources and the random access resource chosen for the previous transmission. The method wherein the re-transmitted access burst employs random access channel (RACH) hopping.

Also, the present disclosure provides a method of determining random access resources performed by a network, the method comprising: transmitting information on available random access resources to a terminal; and transmitting at least one parameter related to a measurement of a downlink radio signal to allow the terminal to decide how to derive the random access resources to be allowed.

The method may further comprise: coordinating at least two cells how the random access resources are allocated and/or the at least one parameter for each random access resource is set. The random access resources may be allocated in a localized or distributed manner. The random access resources may be allocated according to traffic load. The information may be transmitted in a broadcast, multicast or dedicated manner. The parameter may indicate that the measurement of the downlink radio signal comprises at least one of energy of carrier/spectral noise density, signal-to-noise ratio, carrier/interference, and path loss. The random access resources may comprise: sets of any combination of time, frequency, and code. The method wherein a RACH channel comprises M RACH allowed frequencies mapped on the T RACH time offsets, wherein per one cycle, S time offsets per allowed frequencies are defined, and each cycle comprises one or more radio frames. The method wherein per M allowed frequencies cycle, each time offset is defined in order to appear in C different frequencies. The method wherein the parameter indicates that one or more available random access resources is allowed to be used by the terminal if the measurement of the downlink radio signal of at least one of the cell to be accessed and the neighboring cell is larger or smaller than a threshold value.

Certain relative portions of the 3GPP specification, such as 3GPP TS 22.011, 25.321, 25.331, etc. (and their ongoing enhancements and other related sections) are part of the embodiments of the present disclosure and constitute part of the present disclosure by being incorporated herein by reference.

This specification describes various illustrative embodiments of the present disclosure. The scope of the claims is intended to cover various modifications and equivalent arrangements of the illustrative embodiments disclosed in the specification. Therefore, the following claims should be accorded the reasonably broadest interpretation to cover modifications, equivalent structures, and features that are consistent with the spirit and scope of the features disclosed herein.

The invention claimed is:

1. A method of determining random access resources performed by a mobile terminal, the method comprising:
receiving information about available random access resources from a network;
selecting a set of allowed random access resources from the available random access resources based on default values or information received from the network;
measuring signal quality of at least one of a cell to be accessed or a neighboring cell; and
deriving a random access resource from the set of allowed random access resources based on the measuring,
wherein each of the set of allowed random access resources comprises a random access channel (RACH) comprising M RACH allowed frequencies mapped on T RACH time offsets, and S time offsets are defined per a RACH allowed frequency, where each of M, T, and S is a positive number, and
wherein a time offset of the derived random access resource is determined by the following formula:

$$TimeOffset = \left[AllowedFrequencies_j + \left(k \times \frac{T}{S}\right)\right] \% T$$

with: $j = 0, 1, 2, 3, \ldots M; k = 1, 2, 3, \ldots S,$ where % represents a modulo operation.

2. The method of claim 1, wherein the information received from the network is received in a broadcast, multicast or dedicated manner.

3. The method of claim 1, wherein the signal quality comprises at least one of energy of carrier, spectral noise density, signal-to-noise ratio, carrier signal level, interference level, or path loss.

4. The method of claim 1, wherein the available random access resources-comprise a set of any combination of time, frequency, or code.

5. The method of claim 1, wherein one or more available random access resources are allowed to be used if the signal quality of at least one of the cell to be accessed or the neighboring cell is larger or smaller than a threshold value.

6. The method of claim 1, further comprising: performing an access procedure comprising transmitting an access burst, wherein the access burst is re-transmitted based on the set of allowed random access resources and a random access resource chosen for a previous transmission.

7. The method of claim 6, wherein the re-transmitted access burst employs random access channel (RACH) hopping.

8. A method of determining random access resources performed by a network, the method comprising:
transmitting information about available random access resources to a terminal; and
transmitting at least one parameter related to a measurement of a downlink radio signal,
wherein a set of allowed random access resources is selected by the terminal from the available random access resources based on the at least one parameter,
wherein signal quality of at least one of a cell to be accessed or a neighboring cell is measured,
wherein a random access resource is derived from the set of allowed random access resources based on the measurement of the signal quality,
wherein each of the set of allowed random access resources comprises a random access channel (RACH) comprising M RACH allowed frequencies mapped on T RACH time offsets, and S time offsets are defined per a RACH allowed frequency, where each of M, T, and S is a positive number, and
wherein a time offset of the derived random access resource is determined by the following formula:

$$TimeOffset = \left[AllowedFrequencies_j + \left(k \times \frac{T}{S}\right)\right] \% T$$

with: $j = 0, 1, 2, 3, \ldots M; k = 1, 2, 3, \ldots S,$ where % represents a modulo operation.

9. The method of claim 8, further comprising:
coordinating at least two cells how the random access resources are to be allocated or how the at least one parameter for each random access resource is set.

10. The method of claim 9, wherein the random access resources are allocated in a localized or distributed manner.

11. The method of claim 8, wherein the random access resources are allocated according to traffic load.

12. The method of claim 8, wherein the information is transmitted in a broadcast, multicast or dedicated manner.

13. The method of claim 8, wherein the signal quality comprises at least one of energy of carrier, spectral noise density, signal-to-noise ratio, carrier signal level, interference level, or path loss.

14. The method of claim 8, wherein the available random access resources comprise a set of any combination of time, frequency, or code.

15. The method of claim 14, wherein each cycle comprises one or more radio frames.

16. The method of claim 8, wherein one or more available random access resources are allowed to be used by the terminal if the signal quality of at least one of the cell to be accessed or the neighboring cell is larger or smaller than a threshold value.

17. The method of claim 1, wherein C allowed frequencies are defined per a RACH time offset, where C is a positive number, and
wherein an allowed frequency of the derived random access resource is determined by the following formula:

$$AllowedFrequency = \left[TimeOffset_i + \left(n \times \frac{M}{C}\right)\right] \% M$$

with: $i = 0, 1, 2, 3, \ldots T; n = 1, 2, 3, \ldots C$, where % represents a modulo operation.

18. The method of claim 8, wherein C allowed frequencies are defined per a RACH time offset, where C is a positive number, and
wherein an allowed frequency of the derived random access resource is determined by the following formula:

$$AllowedFrequency = \left[TimeOffset_i + \left(n \times \frac{M}{C}\right)\right] \% M$$

with: $i = 0, 1, 2, 3, \ldots T; n = 1, 2, 3, \ldots C$, where % represents a modulo operation.

* * * * *